July 28, 1964 M. M. SHARMA 3,142,807
BIASING MEANS FOR TRANSISTORIZED AMPLIFIERS
Filed June 4, 1962

INVENTOR.
MADAN M. SHARMA
BY Elliott & Pastoriza
ATTORNEYS

United States Patent Office 3,142,807
Patented July 28, 1964

3,142,807
BIASING MEANS FOR TRANSISTORIZED AMPLIFIERS

Madan M. Sharma, Santa Monica, Calif., assignor to Transis-Tronics, Inc., a corporation of California
Filed June 4, 1962, Ser. No. 199,754
1 Claim. (Cl. 330—15)

Figure 1:
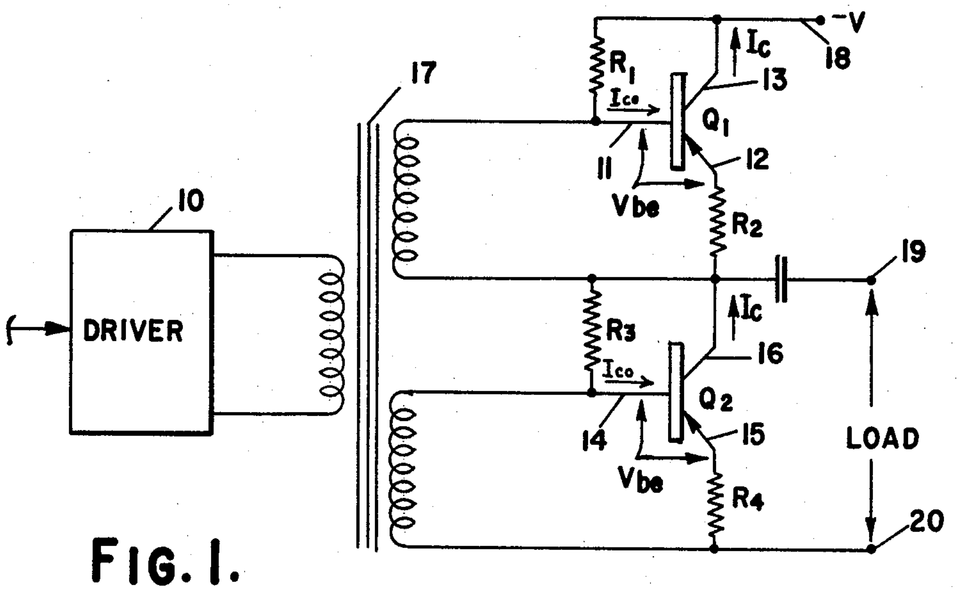

This invention relates generally to transistorized amplifiers and more particularly to an improved biasing means for output transistors in high power class "B" amplifiers.

In conventional biasing circuits for transistor amplifiers, there is no means for adjusting the bias voltage to compensate for changes in leakage current and base to emitter voltage changes in the output transistors. The leakage current and base to emitter voltage are both functions of temperature. As a consequence, the operating point of the output transistors may shift through wide values with variations in temperature resulting in, first, very high dissipation at high temperatures and, second, cross-over distortion at low temperatures.

It is possible to minimize the foregoing undesirable effects by increasing the resistance in the output transistor emitter circuit and decreasing the secondary transformer resistance in the driver feeding the output transistor. In effect, these changes will minimize changes in the collector current of the output transistor as a result of temperature changes. A difficult situation is encountered, however, when designing a high powered transistorized amplifier. In this latter instance, the values of the output transistor emitter resistance and the secondary coil resistance in the driver cannot be freely chosen but are restricted to values which satisfy certain other circuit requirement. For example, the output transistor emitter resistance cannot be increased beyond a certain value since it forms part of the output load circuit.

With the foregoing in mind, it is a primary object of this invention to provide an improved biasing means for high powered transistorized amplifiers.

More particularly, it is an object to provide an improved biasing means for high powered transistorized amplifiers in which high dissipation at high temperatures and cross-over distortion at low temperatures are substantially avoided.

Briefly, these and other objects and advantages of this invention are realized by providing a means that is responsive to a change in the collector current of the output transistor as a consequence of thermal changes to provide a control voltage. This control voltage, in turn, is used to bias the base of a compensating transistor having its emitter and collector terminals in series between the driver output and base terminal of the output transistor. The arrangement is such that a change in the collector current as a result of thermal instability will vary the voltage applied to the base of the compensating transistor to in turn vary the saturating voltage between the emitter and collector terminals of the compensating transistor. This change in the saturation voltage will vary the biasing voltage applied to the base of the output transistor in a manner to change the collector current through the output transistor in a direction which compensates for the change in the collector current.

The base to emitter voltage of the compensating transistor and the output transistor are substantially equal in the absence of any signal and these voltages will vary together in response to thermal variations. As a consequence, current resulting solely from temperature variations which is undesirable is effectively separated from the signal current and compensated for by separation of the compensating transistor to the end that distortion is avoided and dissipation at high temperatures is substantially eliminated.

Figure 2:
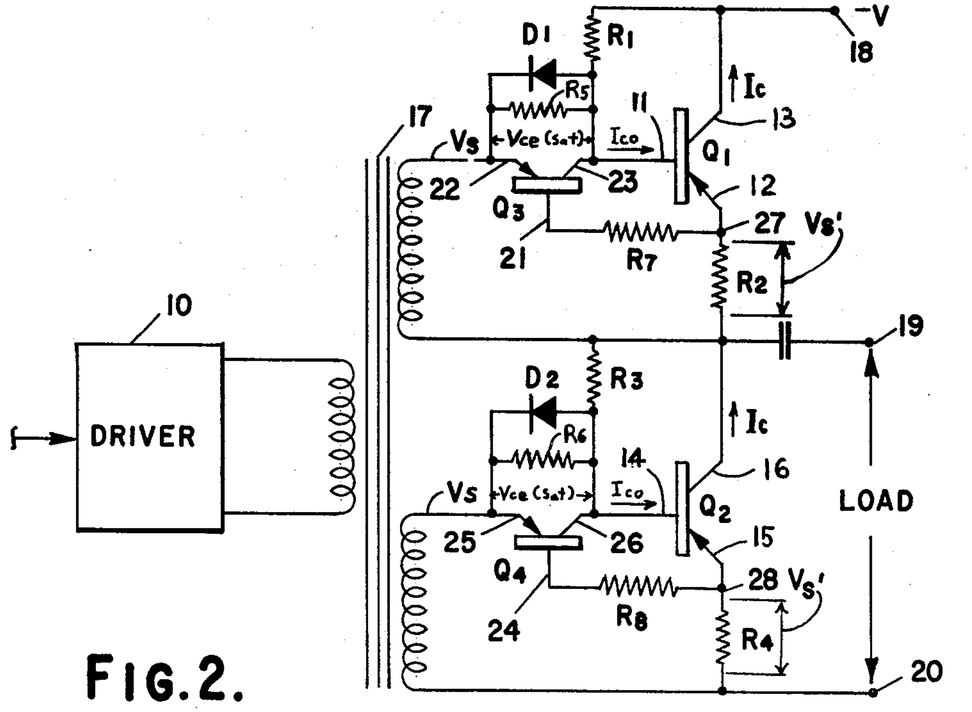

A better understanding of the invention will be had by now referring to a preferred embodiment thereof as illustrated in the accompanying drawings, in which:

FIGURE 1 illustrates the driver and output circuit portion of a conventional transistorized amplifier using conventional biasing techniques; and, FIGURE 2 is a circuit diagram similar to FIGURE 1 wherein the improved biasing means in accordance with the present invention have been incorporated.

Referring first to FIGURE 1, there is shown the driver 10 of a conventional transistorized amplifier feeding first and second output transistors Q1 and Q2. As shown, these transistors respectively have base, emitter, and collector terminals 11, 12, 13, and 14, 15, 16. The signal from the driver 10 feeds the base terminals 11 and 14, respectively, through the driver coupling transformer 17. Output and biasing current for the transistors Q1 and Q2 is derived from a voltage —V on the lead 18. The load driven by the amplifier is connected between output terminals 19 and 20. R1 and R3 represent conventional biasing resistances and R2 and R4 constitute part of the output load circuit.

The above described circuit is entirely conventional, and will operate satisfactorily at normal power levels.

When a high power output is desired, however, there results, as a consequence of temperature changes, a very high dissipation at high temperatures and cross-over distortion at low temperatures. These undesirable features are a direct result of changes in the leakage current $I_{co}$ through the output transistors Q1 and Q2 and changes in the base to emitter voltage $V_{be}$ in these transistors. Essentially, the change in leakage current and change in the base to emitter voltage, if not corrected, will vary the transistor collector current $I_c$ to shift the operating point of the transistor, thereby resulting in the aforesaid dissipation at high temperatures and cross-over distortion at low temperatures.

Referring now to FIGURE 2, there is illustrated the improved biasing circuit of the instant invention which substantially overcomes the foregoing problems. Elements identical to those described in conjunction with FIGURE 1 are identified by the same numerals and letters in FIGURE 2. The circuit of FIGURE 2 is different only in the provision of two compensating transistors Q3 and Q4 having, respectively, base, emitter, and collector terminals 21, 22, 23, and 24, 25, and 26. The transistors Q3 and Q4 are respectively connected in series between the base terminals 11 and 14 of the output transistors Q1 and Q2 and the driver transformer 17. Also included are resistances R5 and R6 and diodes D1 and D2, respectively, shunting the emitter and collector terminals of the transistors Q3 and Q4.

The saturation voltage between the collector and emitter indicated by $V_{ce(sat)}$ is controlled by bias supplied to the base terminals 21 and 24 of each of the compensating transistors. Bias voltage to these bases is derived through a resistance path including resistances R7 and R8 connecting the base terminals, respectively, to junction points 27 and 28 between the emitter terminals of the output transistors Q1 and Q2 and the emitter or load resistances R2 and R4, respectively.

In the operation of the circuit of FIGURE 2, let $V_s$ represent the voltage appearing on the emitter terminals 22 and 25 of the compensating transistors Q3 and Q4 and let $V_s'$ represent the voltages appearing across the emitter resistances R2 and R4. Also, as in FIGURE 1, let $V_{be}$ represent the base to emitter voltage of the transistors Q1, Q3, Q2, and Q4, these voltages being substantially the same in the absence of any signal.

From Kirchhoff's loop law, the sum of the voltages about a closed circuit must equal zero. It is therefore evident that $V_s - V_s' = V_{ce(sat)} + V_{be}$. The $V_{ce(sat)}$ is determined by the base to emitter voltage $V_{be}$ of the transistor Q3. The base to emitter voltage of the transistor Q3 will change with changes in temperature in a manner related to the change in the base to emitter voltage $V_{be}$ of the transistor Q1 such that the difference of the voltages $V_s$ and $V_s'$ remains constant. Therefore, the value of $V_s'$ is maintained independent of changes in the base to emitter voltage of the output transistor Q1. The same analysis applies to transistors Q2 and Q4 since the lower loop is identical to the loop described.

Compensation is also provided for changes in the leakage current $I_{co}$. Thus, a change in leakage current tending to change the collector current $I_c$ results in a momentary change in the value of $V_s'$ since the collector current generates a voltage across resistance R2. The resulting change in $V_s'$ is applied to the base terminal 21 of the compensating transistor Q3 through the resistance path R7 to vary the base to emitter voltage $V_{be}$ in a manner that will change the saturation voltage between the collector and emitter terminals $V_{ce(sat)}$. This change in the saturation voltage will change the bias on the output transistor Q1 in such a manner as to vary the collector current $I_c$ in a direction to compensate for the initial change which tended to vary the value of $V_s'$. There is thus provided compensation so that the collector current is maintained substantially constant.

It will thus be evident from the foregoing that the tendency for changes in the leakage current $I_{co}$ and changes in the base to emitter voltage $V_{be}$ to vary the collector current is automatically compensated for by the provision of the compensating transistors Q3 and Q4.

The resistances R5 and R6 provide a signal path for signal current, and the diodes D1 and D2 provide a signal path for negative cycles of the signal current. These diodes will also conduct in a reverse direction when a given signal level is exceeded. The resistances R1 and R3 as in the circuit of FIGURE 1 function as conventional biasing resistances to keep a small current flowing through the transistors Q1 and Q2 in the absence of any signal.

As a consequence of the foregoing improved biasing techniques wherein the biasing voltage for the output transistors Q1 and Q2 automatically adjusts itself to compensate for changes in the leakage current and base to emitter voltage, dissipation and cross-over distortion is substantially eliminated.

What is claimed is:

In a transistorized amplifier including first and second output transistors connected in push-pull and having base, emitter, and collector terminals, a voltage source connected to said output transistors, and a driver circuit feeding said output transistors, improved biasing means associated with each of said output transistors, each biasing means including: a compensating transistor having base, emitter, and collector terminals, said emitter and collector terminals being connected between said driver circuit and the base of its associated output transistor; a resistance path connected between the base of said compensating transistor and emitter terminal of said associated output transistor whereby a change in collector current through said output transistor as a consequence of thermal instability, changes the voltage applied to the base of said compensating transistor through said resistance path to change the collector-emitter saturating voltage across said compensating transistor thereby changing the biasing voltage to said output transistor in a manner to compensate for said change in said collector current; a resistance shunting the emitter and collector terminals of said compensating transistor to pass signal current from said driver to said associated output transistor; and a diode connected to shunt said resistor, said diode becoming conducting in a reverse direction when the voltage thereacross due to said signal current exceeds a pre-determined value.

References Cited in the file of this patent

UNITED STATES PATENTS

| | | |
|---|---|---|
| 2,912,654 | Hansen | Nov. 10, 1959 |
| 2,999,169 | Feiner | Sept. 5, 1961 |
| 3,040,265 | Forge | June 19, 1962 |
| 3,086,177 | Beers et al. | Apr. 16, 1963 |
| 3,089,098 | Noe | May 7, 1963 |